Figure 1:
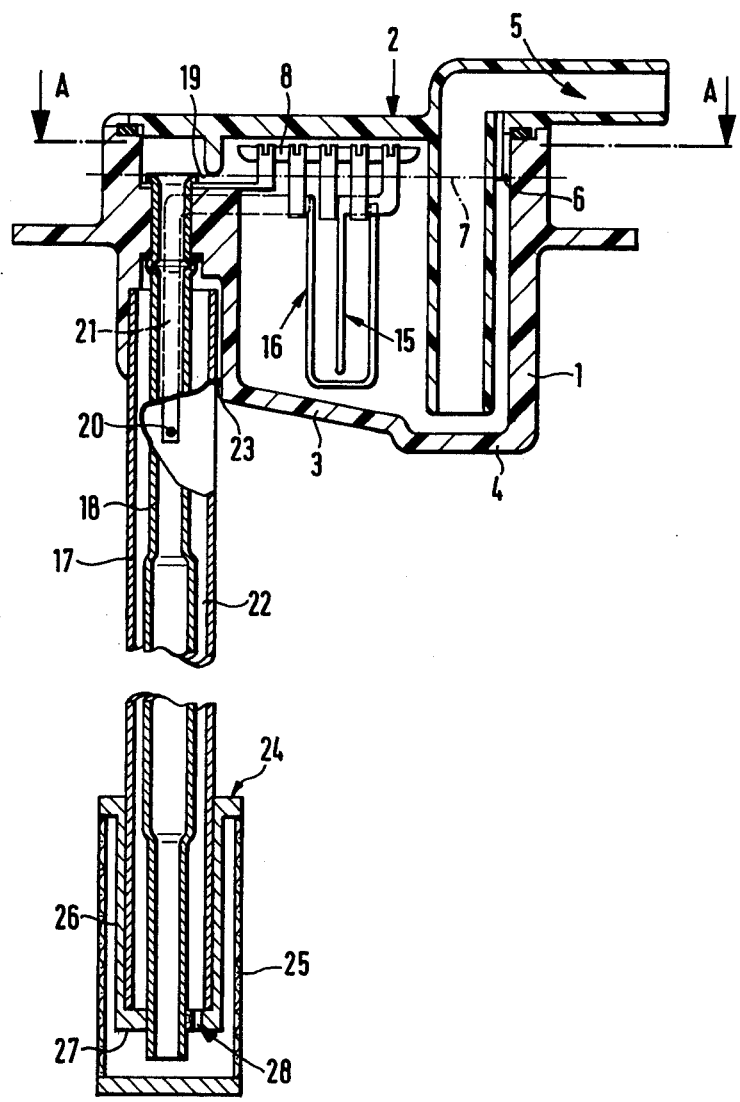

United States Patent [19]

Berryman et al.

[11] Patent Number: 4,467,646

[45] Date of Patent: Aug. 28, 1984

[54] DEVICE FOR THE CAPACITIVE MEASUREMENT OF LEVELS

[75] Inventors: Walter H. Berryman, Croydon; Peter J. Manson, Hawthorn; Adrian H. Hamley, Chirnside Park; Joseph Korb, North Geelong, all of Australia

[73] Assignee: VDO Adolf Schindling AG, Frankfurt am Main, Fed. Rep. of Germany

[21] Appl. No.: 319,021

[22] Filed: Nov. 6, 1981

[30] Foreign Application Priority Data

Nov. 6, 1980 [DE] Fed. Rep. of Germany ....... 3041914

[51] Int. Cl.$^3$ .............................................. G01F 23/26
[52] U.S. Cl. .................................................... 73/304 C
[58] Field of Search ..................................... 73/304 C

[56] References Cited

U.S. PATENT DOCUMENTS

| | | | |
|---|---|---|---|
| 4,204,427 | 5/1980 | Gothe et al. | 73/304 C |
| 4,235,106 | 11/1980 | Maltby et al. | 73/304 C |
| 4,296,630 | 10/1981 | Jung et al. | 73/304 C |

Primary Examiner—Gerald Goldberg
Assistant Examiner—Joseph W. Roskos
Attorney, Agent, or Firm—Martin A. Farber

[57] ABSTRACT

A device for the capacitive measurement of liquid levels, particularly in an automobile tank has a measurement sensor with measurement electrodes arranged concentric to each other forming a measurement capacitor, the space between the measurement electrodes communicating at a variable height with the liquid to be measured, and a channel within an inner of the measurement electrodes through which the liquid is drawn up. Compensation electrodes form a compensation capacitor in a suction path of the liquid with a constant level of the liquid by which the influence of different dielectric constants of the liquid on the result of a measurement is compensatable in an evaluation circuit to which the measurement capacitor and the compensation capacitor are connected. A sump vessel has a bottom disposed lower than an upper opening of the channel within the inner measurement electrode. The compensation electrodes are arranged in the sump vessel. An overflow is in liquid-conducting communication with the channel and the sump vessel, and a suction tube for the liquid extends substantially to the bottom of the sump vessel.

13 Claims, 4 Drawing Figures

DEVICE FOR THE CAPACITIVE MEASUREMENT OF LEVELS

The present invention relates to a device for the capacitive measurement of levels, particularly in an automobile tank, having a measurement sensor with measurement electrodes arranged concentrically to each other and forming a measurement capacitor, the space between the electrodes communicating at a variable height with the liquid to be measured, having a channel within an inner of the measurement electrodes for drawing up the liquid, and having compensation electrodes for forming a compensation capacitor in a suction path of the liquid with a constant level of the liquid by which the influence of different dielectric constants of the liquid on the result of the measurement can be compensated for in an evaluation circuit to which the measurement capacitor and the compensation capacitor are connected.

In one such known device (West German OS No. 29 08 449), the measurement electrodes and the compensation electrodes are arranged on or in an elongated common conduit separated in sections in the manner that the compensation electrodes are located close to at least one inlet channel for the liquid and the ground electrodes are located near the liquid to be measured. In this known device the conduit can be developed in particular as a round plastic cable in which two concentric annular arrangements of electrodes are inserted spaced apart from each other as conduit sections, in which hollow chambers are recessed between the electrodes. The chambers between the electrodes connected as compensation electrodes on the inner circular arrangement serve as vacuum chambers, while the chambers between the electrodes serving as measurement electrodes on the outer annular arrangement communicate with the liquid to be measured.

This device has the disadvantage that the measurement electrodes and the compensation electrodes in the conduit are no longer readily accessible for the establishment of specific measurement characteristics. Errors can occur under certain conditions with respect to compensating for the dielectric properties of the liquid to be measured which is to be obtained by means of the compensation electrodes if the liquid, due to the absence of sufficient vacuum, flows backward within the suction channel, i.e. the suction channel is not filled with the liquid.

The object of the present invention therefore includes further developing a device of the afore-mentioned kind for the capacitive measurement of levels in such a manner that the measurement electrodes and the compensation electrodes are readily accessible before assembling the device and mounting it, for instance, in an automobile tank, and with which assurance can be had that compensating of the dielectric properties of the liquid by immersion of the compensation electrodes into said liquid can be effected by the electronic evaluation system, even under unfavorable operating conditions, in particular in case of loss of the suction in the suction path. This device should furthermore be easy to manufacture and capable of being inserted into practically any tank without substantial changes in the tank.

This object is achieved by developing the device for the capacitive measurement of levels in the manner that the compensation electrodes (15, 16) are arranged in a sump vessel (1) the bottom (3) of which is lower than an upper opening, of the channel within the inner measurement electrode (18) and which sump vessel is in liquid-conducting communication via an overflow (19) with the channel, and a suction tube (5) for the liquid extends to the bottom (3) of the sump vessel.

Due to the fact that the compensation electrodes are arranged in the sump vessel, the bottom of which lies at a lower level than an upper opening of the channel which is formed by an inner tubular electrode (18) and is in liquid-conducting communication, via an overflow with the channel, assurance is had that the compensation electrodes are continuously immersed in the liquid to be measured even when the fluid is not being delivered. By means of the suction tube by which the liquid is drawn off from the sump vessel, which tube is in communication with the sump vessel and extends down to the bottom of the sump vessel, assurance is had that particles of dirt or condensation water cannot collect to any considerable extent within the sump vessel so as to falsify the measurement. Rather, these particles of dirt or water are immediately drawn off with the liquid itself. By the arrangement of the compensation electrodes in the sump vessel, these electrodes can be formed so as to be readily accessible from the outside since they are protected after installation in the sump vessel.

In a further development of the device a vent line (6) extending to the level of the liquid in the sump vessel opens into the suction tube (5).

This vent line provides assurance against the formation of a bubble of gas above the bottom of the sump vessel which would prevent further suction of the liquid through the suction tube. By the provision of the vent line the level of the liquid can rise in the sump vessel up to its inlet opening.

For an immediate removal of particles of dirt or water from the sump vessel which is as complete as possible, the bottom (3) of the sump vessel is furthermore advantageously inclined towards the opening of the suction tube.

As a result, the generally heavier particles of dirt and water flow down to the inlet opening of the suction tube through which they are drawn off.

For ease in installation, the measurement electrodes can be connected in one-piece with the sump vessel, the measurement electrodes (17, 18) being arranged projecting outwardly in the plastic sump vessel (1), so that the measurement electrodes can be inserted together with the sump vessel into a tank in one operation. Before this, the electrodes, which protrude downwardly and are arranged preferably laterally of the sump vessel, can be set and adjusted relatively easily. In a further advantageous fashion, the sump vessel can be closed by a lid, also consisting of plastic, from which the suction tube (5) and possibly the vent line (6) are formed in a manner suitable for manufacture. The lid can be attached to the sump vessel by ultrasonic welding or by adhesion.

For improved mounting of the tubular measurement electrodes (17, 18) they are advisedly held concentrically to each other at their lower end by a cylindrical filter (24).

In this way, the desired configuration of the measurement electrodes can be retained even upon vibrations of the tank in which they are arranged. The filter therefore has a double function, namely on the one hand to filter the liquid drawn through it by means of an outer screen-like wall which may be made of plastic and, secondly, to hold the inner tubular measurement electrode by means of an inner cylinder formed in one piece from the filter, the cylinder surrounding at its bottom the end of the outer tubular measurement electrode and extending up to the inner measurement electrode.

In further suitable fashion, a throttle opening (28) is provided in a substantially closed inner cylinder (26) in the filter, via which opening the space (22) between the measurement electrodes (17, 18) is connected with the inside of the filter. This throttle opening serves to dampen the movement of the liquid to be measured within said space and to assure a corresponding steady indication of the level, even in the event of movement of the tank within which the device is arranged, without the use of additional dampening means.

Furthermore, a development of the device in which an electronic evaluation system (8) is arranged below the lid (2) within the sump vessel (1) and is connected via disconnectable contacts (9-13) to the measurement electrodes (17, 18) and to the compensation electrodes (15, 18) is particularly favorable from the standpoint of manufacture and installation.

In this case the current supply for the electronic evaluation system and the connection of the electronic system to an indicating instrument or the like can be effected over merely a few—preferably three—contact strips which are arranged on the sump vessel.

Further in accordance with the invention a device for the capacitive measurement of liquid levels is provided having an electronic evaluation system which has a fed-back first differential amplifier as a measurement amplifier with the measurement capacitor at one input, a fed-back second differential amplifier as a comparison amplifier with the compensation capacitor at one input, a third differential amplifier (connected to an output of the measurement amplifier) for feeding an indicating instrument, as well as an oscillator for feeding one input of the measurement amplifier and one input of the comparison amplifier, wherein one first input (61 or 32) of the measurement amplifier (31) and of the comparison amplifier (33) respectively is connected directly to the oscillator (29), a second input (36) is connected to the measurement capacitor (35) and a measurement feedback element (39), a second input (38) of the comparison amplifier (33) is connected to the compensation capacitor (37) and to a comparison feed-back element (40), the output (48) of the comparison amplifier is connected to a first input (49) of a fourth differential amplifier (50), the latter being arranged in a feedback branch to a control input of the oscillator (29), the oscillator (29) feeding an empty-position compensation circuit arrangement (34), an output of the latter being conducted to a second input (46 or 51) of the third and fourth differential amplifiers (44 or 50) respectively.

Still further in accordance with the invention there is provided an electronic evaluation system which has a fed-back first differential amplifier as a measurement amplifier with the measurement capacitor at one input, a fed-back second differential amplifier as a comparison amplifier, a third differential amplifier (connected with one input to the output of the measurement amplifier) for feeding an indicating instrument, as well as an oscillator for feeding one input of the measurement amplifier, wherein the oscillator (29) is connected, via an empty-position compensation capacitor (55), to a first input (36) of the measurement amplifier (31) which is grounded via the measurement capacitor (35) and fed back via the comparison capacitor (compensation capacitor 37), a first input (32) of the comparison amplifier (33) being connected via a voltage divider (56) to the oscillator (29), and a second input (38) of the comparison amplifier (33) being connected to the output (41) of the measurement amplifier (31). The output of the comparison amplifier is connected via a full-position compensation capacitor (58) to the first input (36) of the measurement amplifier, and a second input (46) of the third differential amplifier (44) is also connected to the oscillator (29).

By the above the electronic evaluation system is advantageously developed such that not only compensation of the dielectric properties of the liquid is obtained but, in addition, easy calibration can be effected with an empty tank—empty position—and with a full tank—full position. By the use of differential amplifiers the electronic evaluation system is substantially insensitive to influences of disturbing variables, particularly variations of the supply voltage and changes in temperature.

Figure 2:
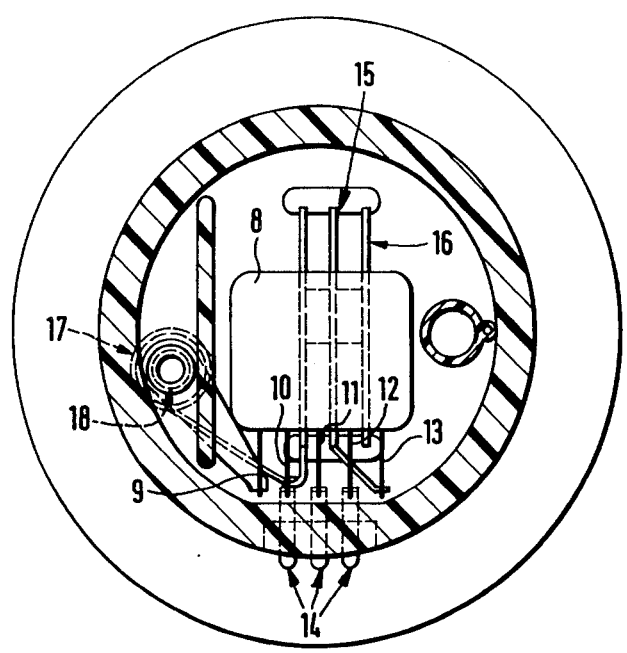
Figure 3:
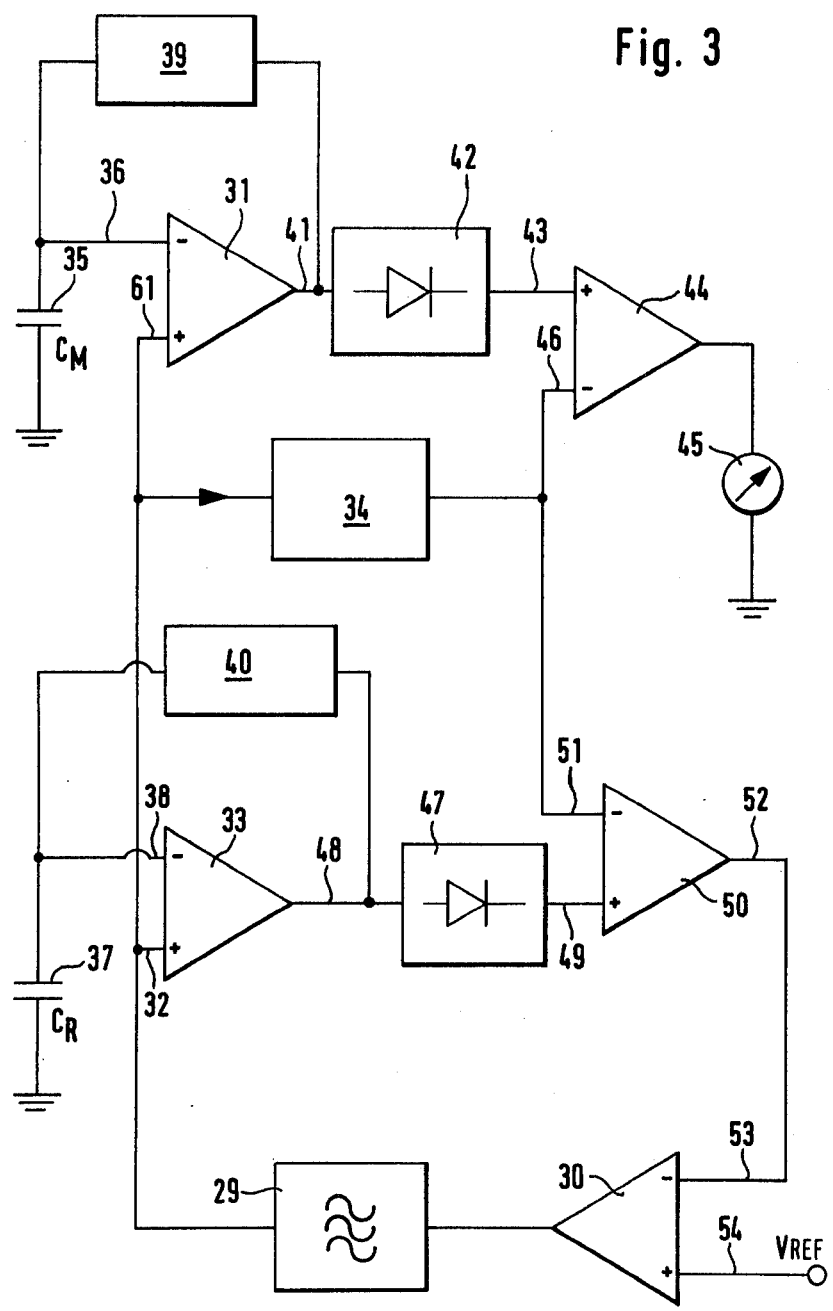
Figure 4:
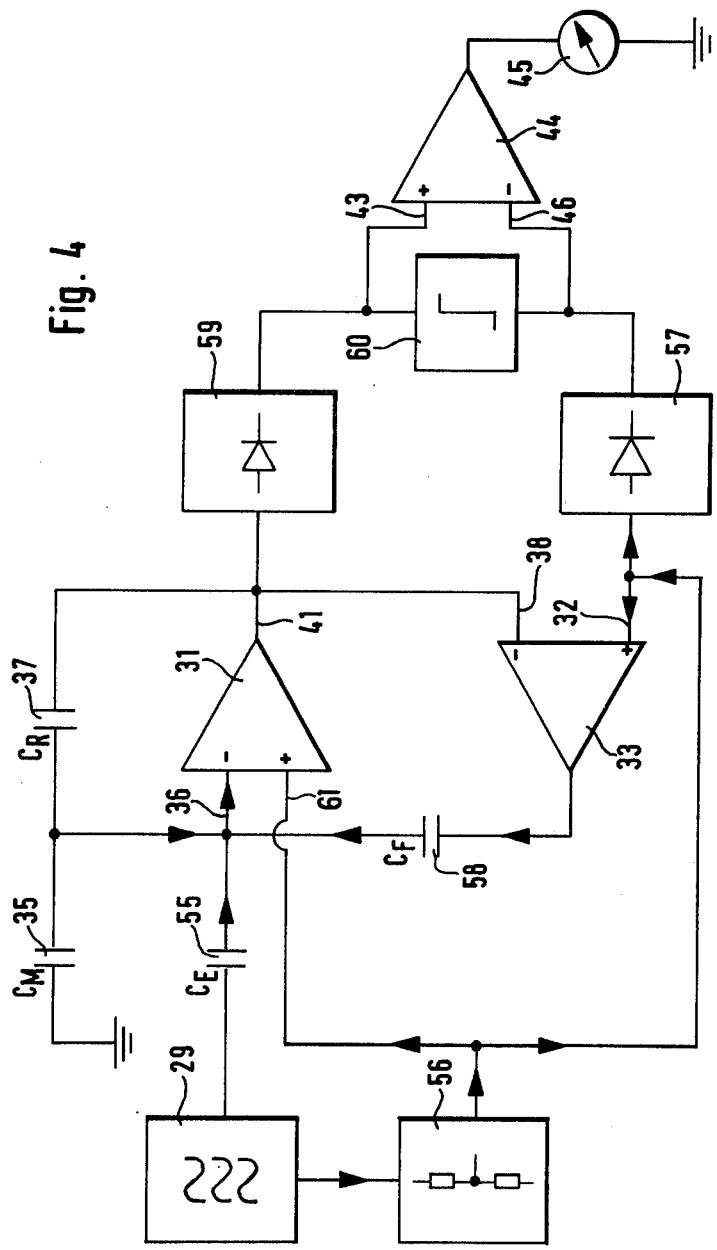

With the above and other objects and advantages in view, the present invention will become more clearly understood in connection with the detailed description of preferred embodiments, when considered with the accompanying drawings, of which:

FIG. 1 shows the sump vessel with the measurement electrodes and compensation electrodes applied and with lid, in a longitudinal section, FIG. 2 shows the sump vessel in a cross section along the line A—A of FIG. 1, FIG. 3 shows a first embodiment of the electronic evaluation system, and FIG. 4 shows a second embodiment of the electronic evaluation system.

In FIG. 1, a sump vessel 1 formed of plastic is closed on top by a lid or cover 2 also made of plastic. The two parts can be produced by injection molding.

The bottom 3 of the sump vessel 1 slopes down to a low point 4.

Above the low point 4 of the bottom there is formed from the lid a suction tube 5 which extends down to close to the low point. Into the suction tube there opens a vent line 6, the lower opening of the vent line 6 extending down to the level 7 of the liquid to be measured, particularly gasoline.

Within the sump vessel there is furthermore provided a gas-tight and liquid-tight encapsulated electronic evaluation system 8 which is connected via disconnectable contacts 9-13 with the compensation and measurement electrodes and also with electrode strips which are conducted out of the sump vessel for connecting the electronic evaluation system to the external source of current and to an indicating instrument. As can be seen, the electronic evaluation system 8 is located above the maximum level of the liquid. The contact strips are designated 14.

Within the sump vessel, compensation electrodes 15 and 16 are inserted in slots, which can be noted in particular in FIG. 2 at the upper end of the compensation electrodes but have not been provided with numbers. The compensation electrodes are made of clad or plated steel, the inner compensation electrode 15 being made of a steel strip which is partially enclosed by the outer compensation electrode 16 which is bent into approximately U-shape. The compensation electrodes are located completely below the level 7 of the liquid.

Two tubular concentrically arranged measurement electrodes 17 and 18, intended for immersion in a tank, extend downward to the outside. The outer measurement electrode is designated 17 and the inner measurement electrode 18. The inner tubular measurement electrode 18 serves for drawing in the liquid up through its channel and transports the liquid from the bottom of the tank (not shown) over an overflow 19 into the inside of the sump vessel. Both measurement electrodes are fit pressed into the sump-vessel container. The inner measurement electrode 18 is furthermore sealed by an O-ring and is widened outwardly in order that it be dependably held. The end of the measurement electrode 18 which end is pressed into the sump vessel serves, in addition, as an electrical contact to the electronic evaluation system 8. The contact is made at the same time as the pressing in place. The outer measurement electrode 17 is held by a weld connection at 20 to a metal strip 21 connected with one of the contact strips 14. The space 22 formed between the measurement electrodes can be vented by vent openings 23 at the sump vessel. The diameters of the two measurement electrodes may vary over their length in order to obtain a desired characteristic curve for the measurement of the level.

At their lower end, the two measurement electrodes are centered by a filter 24 which has an outer screen wall 25 and an inner cylinder 26 which debouches into a bottom 27 having a throttle opening 28. The size of the throttle opening determines the rate of variation with which the liquid level can vary within the space 22. Instead of dampening the output signal by the throttle opening 28, electronic dampening can also be provided in the electronic evaluation system 8, the opening 28 being then so dimensioned that the liquid can flow through without deceleration. Particles of dirt which might result in falsification of the measurements are kept substantially out of the inside of the measurement electrodes and sump vessel by the screen wall 25. Most of the remaining particles of dirt which penetrate into the filter are drawn off through the inside of the inner measurement electrode so that they cannot collect in the space 22.

With respect to the outer compensation electrode 16 it may furthermore be pointed out that it may be provided with slits over approximately half of its length in order to be able conveniently to change the clearance between it and the compensation electrode 15 for calibration.

When the device is in operation, liquid is drawn through the suction tube 5 and the vent line 6 from the inside of the sump vessel in the ratio of the diameter of the suction tube to that of the vent line.

By the provision of the vent line 6 it is seen to it, in particularly advantageous manner, that upon the emptying of the liquid line which connects to the suction tube 5, the sump vessel is emptied only to the level 7 so that the comparison electrodes remain immersed. This level corresponds with the upper opening of the inner measurement electrode. The level 7 in the sump vessel is maintained even if the liquid is forced down in the inner measurement electrode under the action of the gas pressure.

By the device in accordance with the invention the impedance of the capacitor which is formed from the comparison electrodes is placed in relationship to the impedance of the capacitor which is formed with the measurement electrodes. These capacitors are referred to below as a measurement capacitor and a comparison capacitor. The impedance of the measurement capacitor is determined by the level of the liquid in the tank, but also, however, by the dielectric properties of the liquid, which, however, are compensated for by the comparison capacitor which is continuously immersed in the liquid.

Two embodiments of the measurement and compensation electronic systems are shown in FIGS. 3 and 4:

The evaluation circuit in FIG. 3 comprises an oscillator 29 whose amplitude is controlled by a feedback amplifier 30. One output of this oscillator is connected to the non-inverting input 61 of a measurement amplifier 31 and to a non-inverting input 32 of a comparison amplifier 33. Finally the output of the oscillator is connected to an input of an empty position compensation circuit 34. The measurement capacitor 35 formed of the measurement electrodes 17, 18 connects an inverting input 36 of the measurement amplifier 31 to ground potential. The comparison capacitor 37 formed of the compensation electrodes 15, 16 connects an inverting input 38 of the comparison amplifier 33 to ground potential.

Both the measurement amplifier 31 and the comparison amplifier 33 are fed back via a measurement feedback 39 to the inverting input 36 and via a comparison feedback 40 to the inverting input 38.

An output 41 of the measurement amplifier 31 is furthermore connected via a measurement peak detector 42 with a non-inverting input 43 of an output amplifier 44 to whose output an indicating instrument 45 is connected. An output of the empty-position compensation circuit 34 is connected to the inverting input 46 of the output amplifier 44.

A comparison peak detector 47 connects an output 48 of the comparison amplifier with a non-inverting input 49 of a difference amplier 50 whose inverting input 51 is also connected to the output of the empty-position compensation circuit 34.

For the feedback of the oscillator 29 an output 52 of the difference amplifier 50 is connected with an inverting input 53 of the feedback amplifier 30 whose non-inverting input 54 is maintained at the level of a reference voltage $V_{REF}$.

With this circuit arrangement, the liquid level in the tank is determined independently of the dielectric properties of the liquid, the level of which in the tank is to be measured. The empty-position compensation circuit serves in this connection to adjust the indicating instrument to a predetermined value when the tank is empty or at the lowest liquid level.

In principle, the electronic evaluation system shown in FIG. 4, in which identical parts have been provided with corresponding reference numbers, has the same function:

In the electronic evaluation system shown in FIG. 4 the oscillator 29 is connected via a compensation capacitor 55 for the empty position with the inverting input 36 of the measurement amplifier 31 and furthermore, via a voltage divider 56 with the non-inverting input 61 of the measurement amplifier 31 as well as the non-inverting input 32 of the comparison amplifier 33 and a peak detector 57.

The inverting input 36 of the measurement amplifier 31 is furthermore connected via a full-position compensation capacitor 58, with the output of the comparison amplifier 33 and via the measurement capacitor 35 with ground potential and, via the compensation capacitor 37, with its own output 41.

The output 41 of the measurement amplifier is connected via the peak detector 59 with the non-inverting input 43 of the difference amplifier 44 and furthermore with an input of a limiter 60. In similar manner, the output of the peak detector 57 is connected with the inverting input 46 of the difference amplifier 44 and a second input of the limiter 60.

With this circuit arrangement there is again formed in the difference amplifier 44 a measurement value which corresponds to the actual level of the liquid in the tank regardless of the dielectric properties, which in this case are compensated for substantially by the measurement amplifier 31 which is fed back via the compensation capacitor 37.

We claim:

1. A device for the capacitive measurement of liquid levels, particularly in an automobile tank, having a measurement sensor with measurement electrodes arranged concentric to each other and forming a measurement capacitor, the space between the measurement electrodes communicating at a variable height with the liquid to be measured, a channel within an inner of the measurement electrodes through which the liquid is drawn up, and compensation electrodes forming a compensation capacitor in a suction path of the liquid with a constant level of the liquid by which the influence of different dielectric constants of the liquid on the result of a measurement is compensatable in an evaluation circuit to which the measurement capacitor and the compensation capacitor are connected, the improvement comprising
    a sump vessel having a bottom disposed lower than an upper opening of the channel within the inner measurement electrode,
    the compensation electrodes arranged in said sump vessel,
    an overflow in liquid-conducting communication with the channel and said sump vessel, and
    a suction tube for the liquid extending substantially to the bottom of the sump vessel.

2. The device according to claim 1, further comprising
    a vent line opening into said suction tube and extending down to the level of the liquid in the sump vessel.

3. The device according to claim 1 or 2, wherein
    said bottom of said sump vessel is inclined towards an opening at the bottom of said suction tube.

4. The device according to claim 1, wherein
    said measurement electrodes project outwardly from the sump vessel,
    said sump vessel being made of plastic.

5. The device according to claim 1, further comprising
    a plastic lid closing said sump vessel,
    said suction tube being formed from said lid.

6. The device according to claim 5, wherein
    said vent line is formed from said lid.

7. The device according to claim 1, further comprising
    a cylindrical filter constituting means for holding said measurement electrodes concentrically relative to each other at their lower ends and for filtering the liquid passing therein.

8. The device according to claim 7, wherein
    said filter includes therein a substantially closed inner cylinder formed with a throttle opening, said throttle opening communicating the space between said measurement electrodes with an inside of said filter.

9. The device according to claim 5, further comprising
    an electronic evaluation system arranged under said lid in said sump vessel, and
    disconnectable contacts connecting said electronic evaluation system to said measurement electrodes and to said compensation electrodes.

10. In a device according to claim 1 and having an electronic evaluation system which has a fed-back first differential amplifier as a measurement amplifier with a measurement capacitor at one input, a fed-back second differential amplifier as a comparison amplifier with a compensation capacitor at one input, a third differential amplifier connected to an output of the measurement amplifier for feeding an indicating instrument, as well as an oscillator for feeding one input of the measurement amplifier and one input of the comparison amplifier, the improvement wherein
    said compensation electrodes constitute the compensation capacitor,
    said measurement electrodes constitute the measurement capacitor,
    a fourth differential amplifier, one first input of the measurement amplifier and of the comparison amplifier respectively connected directly to the oscillator, a second input of said measurement amplifier connected to the measurement capacitor and to a measurement feedback element which is operatively connected to the output of said measurement amplifier,
    a second input of the comparison amplifier connected to the compensation capacitor and to a comparison feed-back element which is operatively connected to the output of said comparison amplifier, the output of the comparison amplifier is operatively connected to a first input of said fourth differential amplifier, the latter being arranged in a feedback branch to a control input of the oscillator,
    an empty-position compensation circuit arrangement having an output connected to a second input of the third and fourth differential amplifiers, respectively, and
    said oscillator comprising means for feeding said empty-position compensation circuit arrangement.

11. In the device according to claim 1, and having an electronic evaluation system which has a fed-back first amplifier as a measurement amplifier with a measurement capacitor at one input, a fed-back second differential amplifier as a comparison amplifier, a third differential amplifier operatively connected with one input to the output of the measurement amplifier and for feeding an indicating instrument, as well as an oscillator for feeding one input of the measurement amplifier, the improvement wherein
    said compensation electrodes constitute a compensation capacitor,
    said measurement electrodes constitute the measurement capacitor,
    an empty-position compensation capacitor connecting the oscillator to a first input of the measurement amplifier, said first input being grounded via the measurement capacitor and fed back via the compensation capacitor to an output of the measurement amplifier,
    a voltage divider,
    a first input of the comparison amplifier connected via said voltage divider to the oscillator, a full-position compensation capacitor connecting the output of the comparison amplifier via said full-position compensation capacitor to the first input of the measurement amplifier, a second input of the comparison amplifier connected to the output of the measurement amplifier and a second input of the third differential amplifier operatively connected to the oscillator.

12. The device according to claim 10, further comprising separate peak detectors each connecting the outputs of said measurement amplifier and of said comparison amplifier respectively to the third and fourth differential amplifiers, respectively, of said electronic evaluation system.

13. The device according to claim 11, further comprising separate peak detectors connecting the output of said measurement amplifier and the output of said voltage divider respectively to said first and second inputs of said third differential amplifier, respectively, of said electronic evaluation system.

* * * * *